United States Patent [19]

Kovacs et al.

[11] 3,966,655
[45] June 29, 1976

[54] MANUFACTURE OF POLYESTER IMIDE DISPERSIONS

[75] Inventors: Jenoe Kovacs, Bobenheim-Roxheim; Hans Jung, Ludwigshafen; Matthias Marx, Bad Duerkheim; Herbert Spoor, Limburgerhof; Wilfried Roschke, Frankenthal, all of Germany

[73] Assignee: BASF Aktiengesellschaft, Ludwigshafen (Rhine), Germany

[22] Filed: Oct. 10, 1974

[21] Appl. No.: 513,834

[30] Foreign Application Priority Data
Oct. 11, 1973 Germany............................ 2351077
Oct. 11, 1973 Germany............................ 2351078

[52] U.S. Cl............................ 260/29.2 N; 428/402
[51] Int. Cl.² ........................ C08J 3/08; C08J 3/12
[58] Field of Search .................. 260/29.2 N, 29.2 E

[56] References Cited
UNITED STATES PATENTS

| 3,179,631 | 4/1965 | Eudrey............................ 260/29.2 N |
| 3,536,647 | 10/1970 | Battista........................... 260/29.2 N |
| 3,652,511 | 3/1972 | Vincent et al. ................ 260/29.2 N |

*Primary Examiner*—Murray Tillman
*Assistant Examiner*—J. Ziegler
*Attorney, Agent, or Firm*—Johnston, Keil, Thompson & Shurtleff

[57] ABSTRACT

Aqueous polyester imide dispersions are prepared by allowing molten polyester imide to solidify and then comminuting it in the dry state to a particle size of 100 $\mu$m or less, whereupon the particles are milled in water to a particle size of less than 5 $\mu$um. The dispersions may be used for the manufacture of heat-resistant bonds and impregnations and for electrical insulation of metallic conductors. m.

12 Claims, No Drawings

MANUFACTURE OF POLYESTER IMIDE DISPERSIONS

The present invention relates to a process for the manufacture of aqueous polyester imide dispersions containing polyester imide in the form of solid particles having a particle size of less than 5 μm. The invention also relates to the use of such dispersions for the manufacture of heat-resistant impregnations and bonds.

It is known to prepare polyester imides in solution or in the molten state (cf. for example German Published Applications 1,445,263; 1,495,152; and 1,645,435). Due to the low volatility of the solvents used, for example phenols, cresols, xylenols and acid amides, said solvents tend to become deposited in the processing equipment. Furthermore, residual solvent passing into the atmosphere is undesirable and environmentally dangerous. Since the concentration of the polymer solutions is usually low, namely from about 16 to 33%, the proportion of dangerous off-gases produced when the solutions are processed is particularly high. The low solids content of these products is also the cause of relatively poor processing properties, i.e. poor edge coverage, difficulty in the removal of the solvent and thus bubble formation or crater formation during drying.

When conventional aqueous solutions of polyester imides (German Published Application 1,720,321) are baked, amines are liberated. Processing of polyester imides in the molten state involves great difficulty in temperature control, since the temperature required to achieve the viscosities necessary for processing and thus the desired layer thickness is so high that further condensation is hardly avoidable.

Although recently powder systems have increased in interest, such systems require highly specialized equipment in use. The application of such powders in a number of layers, as required for example to obtain flawless insulating coatings, is not possible.

These difficulties may be overcome to a large extent by using aqueous dispersions.

It is known to prepare aqueous polymer dispersions by emulsion polymerization of monomeric polymerizable compounds which have been dispersed in water with the aid of surfactants, such emulsion polymerization being carried out in the presence of polymerization initiators, but the advantages of emulsion polymerization are not generally obtained in the manufacture of specific heat-resistant polyester imides, since in this case the presence of water is detrimental to the polycondensation or polyaddition reaction.

German Published Application 2,210,484 mentions aqueous polyester imide dispersions having particle sizes of up to 150 μm and to which high molecular weight auxiliaries must be added to prevent settling and agglomeration. In this case, however, the said additives tend to impair adhesion of the polyester imide to the substrate.

It is an object of the present invention to provide a process for the manufacture of very fine and stable aqueous polyester imide dispersions showing a variety of applications without the occurrence of the above drawbacks of solutions, which dispersions may be advantageously used as wire coatings and for heat-resistant impregnation and bonding of heat-resistant organic or inorganic sheeting, nonwoven webs, papers and fibrous materials.

The present invention relates to a process for the manufacture of aqueous polyester imide dispersions containing from 20 to 60% by weight of polyester imide in the form of solid particles having a particle size of less than 5 μm and optionally containing small amounts of flow promoters, fillers, dispersing agents and/or esterification catalysts, in which process the molten polyester imide is allowed to solidify and is then comminuted in the dry state to particle sizes of 100 μm or less at temperatures of less than 100°C, whereupon the particles are milled in water at temperatures of less than 80°C to a particle size of less than 5 μm, more than 80% of the particles having a particle size of less than 1 μm.

In one advantageous embodiment of the process of the invention, milling (in water) of the polyester imide which has been comminuted to particle sizes of 100 μm and less is carried out in dispersing machines containing milling elements of high local energy densities at temperatures of less than 40°C. We particularly prefer to manufacture aqueous polyester imide dispersions in which the particle size of the polyester imide particles is from 0.05 to 1.5 μm, more than 90% of the particles having a size of less than 1 μm.

The present invention also relates to the use of the dispersions of the invention for electrical insulation of metallic conductors and for the preparation of heat-resistant bonds and impregnations.

The following comments relate to individual features of the process of the invention.

The product obtained in the manufacture of polyester imides at temperatures of from 150° to 300°C is generally a highly viscous melt.

Comminution of the polyester imide in the dry state to a particle size of 100 μm or less, preferably to from 10 to 80 μm, may be effected in a variety of ways. For example, the melt may be subjected to preliminary comminution by means of a cooled drum flaker or by atomization in a spray tower and then finally comminuted to a particle size of 100 μm or less in mechanical mills such as disc mills and cage disintegrators. According to the invention, this is effected at temperatures below 100°C and preferably below 60°C.

The fine dispersions of the invention are then produced from the coarse polyester imide powder obtained, by subjecting said powder to a milling process in the presence of water.

Said wet milling is carried out in mechanical dispersing equipment, for example ball mills, preferably dispersing machines containing milling elements of high local energy density achieved by causing extra acceleration of the balls by means of built-in stirrers. Such stirring units have a high rotary speed, the peripheral speed being perferably greater than 10 m/s. Impact of the balls against the polyester imide particles is effected with such high energy that the particles are broken up to the desired degree of fineness. This wet milling process is carried out at temperatures below 80°C and preferably below 40°C. Preferred grinding elements are spherical elements, for example elements of glass, ceramics or hard attritionresistant plastics, e.g. polyamide, their diameter being from 0.2 to 8 mm and preferably from 0.4 to 5 mm.

The time required for milling to the desired particle size is generally from 2 to 20 hours and depends on the brittleness of the polyester imide used. Lowering of the temperature accelerates the milling process. Milling may be carried out continuously or batchwise.

Toward the end of the wet milling operation it is possible to add flow promoters, esterification catalysts and, if desired, other additives such as pigments, fillers, dyes, crosslinking catalysts and accelerators. It is advantageous to continue milling for another one to two hours after the addition of the catalyst. There are thus obtained dispersions containing particles having a particle diameter of less than 5 μm and preferably of between 0.05 and 1.6 μm, more than 90% of the particles being smaller than 1 μm.

The dispersions produced in the manner proposed by the present invention may be directly used for electrical insulation of metallic conductors, particularly wires and bars, in which case conventional methods of application and conventional equipment may be used. They may also be employed for the manufacture of impregnations, bonds, laminates and prepregs.

The dispersions prepared in the manner of the invention exhibit none of the above drawbacks of conventional organic coating solutions. They do not require the additional equipment normally necessary when using powdered systems and they are suitable for applications by conventional methods such as spraying, dipping, pouring, flooding, impregnating, brush-coating and knife-coating. The dispersions prepared in the manner of the invention provide high-quality heat-resistant electrical insulations, impregnations, bonds, laminates and prepregs. The dispersions prepared in the present manner may be processed in the manner of conventional binder solutions. It is surprising and was unforeseeable that the properties of electrical insulations, laminates, prepregs, impregnations and bonds produced with conventional polyester imide binder solutions should be the same as those produced using the aqueous dispersions prepared in the manner of the invention.

In the manufacture of electrical insulating coatings on copper wire, there was no essential difference between the coating and electrical properties thus obtained and those obtained in coatings produced with the same binder but from solution. In fact, the hardness of the former coatings was even higher. Of particular advantage was the processability, since use of the dispersions of the invention had no undesirable effect on the environment and led to a higher processing rate which, in the case of wire coating, was manifested by a drawing off speed of from 1.5 to 1.7 times higher. A further processing advantage is that the suspensions of the invention may be processed at higher concentrations than solutions of the same binder. For example, a wire coating suspension of the present invention may have a concentration of 33% when applied from a bath with the aid of nozzle wipers or felt wipers, whereas a solution containing the same binder may usually have a concentration of from only 23 to 25% when processed in the same machine and at the same rate.

It is characteristic of dissolved wire coatings that they produce undesirable odors in the coating chamber, but such odors are not evident in the case of the suspensions. Furthermore, no environmentally undesirable materials are discharged through exhausts or drains.

The advantages of the polyester imide dispersions of the invention are also evident in the manufacture of composites, e.g. glass fiber reinforced materials, ply materials, particularly those based on polyacrylamide paper webs, mica sheeting and similar materials. Impregnation of the reinforcing material is non-hazardous, as there is no risk of fire. Special venting measures for the recovery of solvent and post-combustion equipment for solvents are not necessary, since only water evaporates in any appreciable amount. Thus the impregnating, laminating and bonding agents prepared in the manner of the invention assure substantial economical advantages over the prior art process.

The following comments relate to the polyester imides to be used in the present invention. The preparation of polyester imides may be carried out by various processes and is not within the scope of the present invention. It is characteristic of the polyester imides to be used in the invention that they are condensates containing both ester groupings and imide groupings. Particularly advantageous polyester imides are those which contain, as connecting links, five-membered imide rings fused with aromatic nuclei. A typical condensate is based, for example, on ethylene glycol, trishydroxyethyl isocyanurate, terephthalic acid, trimellitic anhydride and 4,4'-diaminodiphenylmethane. In place of the individual components it is possible to use reaction products of the separate components or precondensates, for example the reaction product of 4,4'-diaminodiphenylmethane with trimellitic anhydride.

Polyester imides suitable for the process of the invention may, for example, be composed of the following components in the proportions given:

1. from 10 to 50 parts by weight of the reaction product of 2 moles of a cyclic anhydride of an aromatic tricarboxylic or tetracarboxylic acid having carboxylic groups in the ortho position and 1 mole of a diprimary amine or a compound having one primary amino group and one further functional group or the individual components of said reaction product with 2. terephthalic acid and/or isophthalic acid and/or 4,4'-benzophenonedioic acid or derivatives of these acids, particularly their alkyl monoesters and/or alkyl diesters, halides or anhydrides, 3. one or more polyhydric alcohols in amounts of from 1 to 1.8 equivalents per equivalent of carboxylic acid.

Preferred embodiments contain mixtures of polyhydric alcohols containing tris-(2-hydroxyethyl) isocyanurate or tris-β-hydroxyethyl imide of mellitic acid. Polyester imides containing a high proportion of these polyols exhibit particularly good heat resistance and heat shock resistance.

Suitable cyclic anhydrides of aromatic tricarboxylic or tetracarboxylic acids containing carboxyl groups in the ortho position are trimellitic anhydride and pyromellitic anhydride, and also other aromatic carboxylic anhydrides such as naphthalene tetroic dianhydride, or dianhydrides of tetracarboxylic acids having two benzene nuclei in the molecule in which the carboxylic groups are in the 3,3'- and 4,4'-positions, and compounds such as 2,2',3,3'-benzyl-phenonetetroic dianhydride.

Examples of diprimary diamines are ethylene diamine, tetramethylene diamine, hexamethylene diamine and other aliphatic diprimary diamines. Particularly suitable are aromatic diprimary diamines such as benzidine, diaminodiphenylmethane, diaminodiphenylsulfone, diaminodiphenyl ether, diaminodiphenyl sulfoxide, diaminodiphenyl thioether, phenylene diamines, toluylene diamines, xylylene diamines and also diamines having 3 benzene nuclei in the molecule such as bis-(4-aminophenoxy)-1,4-benzene and cycloaliphatic diamines such as 4,4'-dicyclohexylmethane diamine.

Also suitable are amino group-containing compounds having a further functional group such as monoethanol amine and monopropanol amines, aminocarboxylic acids such as glycin, aminopropionic acids, aminocaproic acids and aminobenzoic acids.

If necessary, the pH of the dispersion of the invention is adjusted to a value between 5 and 9 by means of a neutralizing agent (amine or acid).

If it is necessary to use dispersing agents, suitable agents are ionic or non-ionic organic dispersing agents which are truly or colloidally soluble in the aqueous phase, but it is preferred to use non-ionic emulsifiers which substantially disintegrate at the processing temperatures of about 150°C. Examples of such emulsifiers are ethoxylated or oxypropylated alcohols, phenols, carboxylic acids, castor oils and the like. They are used in a concentration of from 0.1 to 10% and preferably from 2 to 5%, by weight of the dispersed material. It is also possible to use, as protective colloid, water-soluble high molecular weight substances such as polyvinyl pyrrolidone, polyvinyl alcohols containing up to 30% molar of residual acetate groups, copolymers of vinyl pyrrolidone and vinyl propionate and copolymers of acrylic acid and acrylonitrile. These substances are preferably used in amounts of from 0.1 to 6% by weight.

Suitable esterification catalyst systems, which are preferably added to the polyester imide melt, are those generally used as condensation catalysts in the manufacture of polyester terephthalates, for example antimony acetate, triethanolamine titanate, butyl titanate, cresyl titanate, oxotitanium compounds and acid catalysts such as p-toluenesulfonic acid. They are used in a concentration of from 0.2 to 5.0%, by weight of the dispersed material. The choice of catalyst and its concentration depend on the method of processing the dispersion and on the desired properties of the wire coatings, impregnations or bonds.

The dispersions prepared by the process of the invention may be used without the addition of flow promoters. However, it is advisable, in some cases, to use small amounts of water-soluble flow promoters such as polyalcohols, e.g. glycerol, glycol and butylglycol, acid amines, e.g. N-methyl pyrrolidone, dimethyl formamide and dimethyl acetamide, and diphenyl, phenols, cresols and lauric acid in a concentration of from 0.1 to 10% and preferably from 1 to 5%, by weight of the solids.

Fillers may be used, if desired, in amounts of from 0.1 to 25% and preferably from 2 to 10%, by weight, examples thereof being dolomites, silicates and molecular sieves. It is also possible to include pigments such as inorganic oxides, e.g. titanium dioxide, and loading agents such as heavy metals.

If it is desired to modify the properties of the polyester imides, it is possible, to a certain extent, to combine them with other heat-resistant plastics having a melt point below 300°C, for example linear and crosslinked polyesters, polyhydantoins, polyamides and in general all those plastics which give end products having a life of 25,000 hours at a temperature of more than 100°C and preferably of more than 150°C (DIN 53,440).

The polyester imides are present in the dispersions of the invention in an amount of from 20 to 60% and preferably from 25 to 45%, by weight. The particle or size of the dispersed polyester imide particles is less than 5 $\mu$m and preferably between 0.05 and 1.5 $\mu$m. The shape of the particles, which may be spherical or orthorhombic and may have a smooth or rough surface, usually has no great influence on the application and properties of the resulting wire coatings, impregnations and bonds.

In the following Examples, the parts and percentages are by weight unless otherwise stated.

EXAMPLE 1

Preparation of a dispersion of polyester imide and its use as a wire coating

Polyester imide, prepared from glycerol, diaminodioic acid (reaction product of trimellitic anhydride and 4,4'-diaminodiphenylmethane), dimethyl terephthalate and glycol and having a melting point of 120°C and a viscosity of 63 centistokes is heated at 190°C and extruded through a sheeting die onto a cooling roller. The thickness of the layer applied to the roller is 0.1 mm. This layer is scraped from the roller by means of a polyamide knife. The resulting particles have a maximum volume of 2.5 cubic millimeters. These flakes are comminuted in a disc mill (9,000 r.p.m., 5 kg/hr) to an average particle size of 20 $\mu$m. This mill is cooled in such a manner that the temperature during comminution does not exceed 30°C. By means of a sifter, the product obtained in the mill is separated and the portion thereof (50%) having a particle size greater than 20 $\mu$m is returned to the mill. In this way there is obtained a dry powder having a particle size of less than 20 $\mu$m.

To produce 1,000 parts of dispersion, 150 parts of polyester imide precondensate powder were dispersed for 3 hours in a ball mill with 578 parts of distilled water. A further 150 parts of polyester imide precondensate powder and 10 parts of glycol as flow promoter were then added to the ball mill and dispersion was continued for a further 4 hours. After a total dispersing time of 7 hours, a further 100 parts of polyester imide precondensate, 10 parts of glycol and 2 parts of antimony acetate were added and dispersion was continued for a further 4 hours. The ball mill was lined with rubber and the balls used were of glass. After 15 hours, the dispersion was removed from the mill and sedimentation analysis was carried out. It was found that 95% of the particles in the dispersion had a particle size of less than 1 $\mu$m and 55% of the particles had a size of less than 0.5 $\mu$m. The speed of the ball mill was adjusted so as to give a temperature in the dispersion of not more than 35°C throughout the period of dispersion.

The 40% dispersion was diluted with de-ionized water to a concentration of 30% and was continuously applied to copper wire having a diameter of 1 mm in a horizontal wire-coating oven having a length of 3.7 meters. The oven temperature was 470°C; the method of application was by means of a roller and felt wiper; six coatings were applied; the drawing off speed was 4 m/min; and the total thickness of the coating was 50 $\mu$m.

Tests on the coating gave the following results:

| | |
|---|---|
| pencil hardness | 5 H |
| pencil hardness after treatment for 1 hour in benzene at 60°C | 3 H |
| pencil hardness after treatment for 1 hour in ethanol at 60°C | 3 H |
| heat shock test (coil of wire wound around pins having diameter of wire after annealing at 155°C for 1 hour) | satisfactory |

EXAMPLE 2

Preparation of a dispersion of polyester imide precondensate for laminating wovens and non-wovens The polyester imide precondensate is milled dry to a particle size of 20 μm as in Example 1. Dispersion is effected with stirred ball mills using glass spheres having a diameter of from 1 to 5 mm. 300 parts of polyester imide precondensate powder and 361 parts of distilled water are placed in the stirred ball mill and dispersion is carried out for 3 hours, whereupon a further 300 parts of polyester imide powder containing 3 parts of antimony acetate are added together with 12 parts of glycol and 24 parts of N-methyl pyrrolidone, dispersion being continued for a further 7 hours. There are thus obtained 1,000 parts of product.

Glass mat and a non-woven glass web are each coated on one side with the above dispersion. These woven and non-woven glass structures are passed, after coating, through a drying apparatus at a speed of 2 m/min and are dried at 200°C. The length of the drying apparatus is 2 meters. Tests show that the rate of application obtained by this method is from 0.2 to 1.5 g. of polyester imide per square centimeter of woven or non-woven material.

When these coated materials are placed one against the other, they may be subjected to a pressure of from 5 to 8 kg/cm² at a temperature of 300°C to form boards. Table 1 gives the pressing time in relation to the number of layers:

TABLE 1

| Number of layers: | 2 | 4 | 8 | 16 | 32 |
|---|---|---|---|---|---|
| Pressing time (min.): | 1 | 4 | 9 | 10 | 15 |

When use is made of a protective colloid and coarser particles as described in German Published Application 2,210,484, the laminates obtained have lower flexural strength.

EXAMPLE 3

Preparation and processing of a dispersion of polyester imide for bonding insulating papers to foils 300 parts of polyester imide precondensate powder are dispersed with 361 parts of distilled water for 3 hours in a stirred ball mill. There are then added to the mill 300 parts of polyester imide powder differing from that described in Example 1 only in the replacement of glycerol by trishydroxyethyl isocyanurate and containing 3 parts of antimony acetate, together with 36 parts of N-methyl pyrrolidone and dispersion is continued for a further 8 hours with ethoxylated castor oil. The resulting dispersion is applied to an insulating paper (polyester amide paper) as in Example 2 and dried. Drying is effected over a distance of 2 meters at a temperature of 150°C and a velocity of 2 m/min. The paper is bonded to foil at a temperature of 290°C on a calender roll having a diameter of 500 mm, the loop extending over 270° and the nip pressure being 14 kg/cm, the foil being in contact with the calender.

EXAMPLE 4

400 parts of a polyester imide precondensate powder having a particle diameter of about 60 μm are dispersed with 550 parts of demineralized water, 14 parts of butyl glycol and 6 parts of diglycol and milled in a stirred ball mill for 6 hours. The dispersion then contains 95% of particles having a diameter of less than 1 μm. There are then added to the dispersion 8 parts of a copolymer of vinyl pyrrolidone and vinyl propionate and 6 parts of triethanolamine titanate and 2 parts of glycerol.

The dispersion is then processed in a wire-coating machine at a temperature of 480°C and at a rate of 10 m/min., baking being effected over a length of 6 meters. The off-gases were found to contain only water vapor and hydrocarbons in amounts of less than 0.1 ppm. The coated wires were tested according to DIN 46,453 and were found to meet the requirements of H-class coatings (over 180°C). The heat shock temperature was found to be 220°C (1 × wrap/1 hr). The bond withstood more than 150 to-and-fro passes in the repeated scrape test.

We claim:

1. A process for the manufacture of an aqueous polyester imide dispersion containing 20 to 60% by weight of said polyester imide in the form of solid particles having a diameter of less than 5 μm, said process comprising the steps of solidifying a composition consisting essentially of a molten polyester imide, comminuting the solid polyester imide in the dry state to particle sizes of about 10 to 100 μm at temperatures of less than 100°C, and thereafter milling the comminuted particles in water at temperatures of less than 80°C to a diameter of less than 5 μm, more than 80% of the particles having a diameter of less than 1 μm.

2. A process as claimed in claim 1, wherein said milling in water of the comminuted polyester imide having a particle size of about 10 to 100 μm is effected in a dispersing machine containing milling elements of high local energy densities at temperatures of less than 40°C.

3. A process as claimed in claim 1, wherein milling of the comminuted polyester imide in water is effected in a dispersing machine having spherical milling elements of a diameter of from 0.2 to 8 mm, said milling elements being accelerated by additional stirring units having a peripheral velocity of more than 10 m/sec.

4. A process as claimed in claim 1, wherein the polyester imides are condensates of aromatic dicarboxylic acids and polyhydric alcohols and contain from 10 to 50% by weight of a reaction product of 2 moles of a cyclic anhydride of an aromatic tricarboxylic acid or tetracarboxylic acid having carboxyl groups in the ortho position and 1 mole of a diprimary amine or a compound containing 1 primary amino group and 1 hydroxyl or carboxyl group.

5. A process as claimed in claim 1, wherein the particles are milled in water to a particle diameter of from 0.05 to 1.5 μm, more than 90% of the particles being smaller than 1 μm.

6. A process as claimed in claim 1, wherein the aqueous dispersion contains from 25 to 45% by weight of polyester imide.

7. An aqueous polyester imide dispersion obtained by the process of claim 1 and consisting essentially of water and 20 to 60% by weight, with reference to the dispersion, of the polyester imide in the form of solid particles having a particle size of less than 5 μm, more than 80% of the particles being smaller than 1 μm.

8. A dispersion as claimed in claim 7 which contains as additives from 0.1 to 10% by weight of water-soluble dispersing agents, from 0.2 to 5% by weight of esterification catalysts, from 0.1 to 10% by weight of water-soluble flow promoters and up to 25% weight of fillers, the percentages being based on solids.

9. A dispersion as claimed in claim 7 containing from about 0.1 to 6% by weight of a water-soluble, high molecular weight dispersing agent.

10. A dispersion as claimed in claim 9 wherein said dispersing agent is selected from the group consisting of polyvinyl pyrrolidone, polyvinylalcohols containing up to 30% residual acetate groups, copolymers of vinyl pyrrolidone and vinyl propionate and copolymers of acrylic acid and acrylonitrile.

11. A dispersion as claimed in claim 7 wherein said polyester imide is based upon ethylene glycol, trishydroxyethyl isocyanurate, terephthalic acid, trimellitic anhydride and 4,4'-diaminodiphenylmethane.

12. A process as claimed in claim 1 wherein said polyester imide is based upon ethylene glycol, trishydroxyethyl isocyanurate, terephthalic acid, trimellitic anhydride and 4,4'-diaminodiphenylmethane.

* * * * *